(12) United States Patent
Teusch et al.

(10) Patent No.: US 11,054,378 B2
(45) Date of Patent: Jul. 6, 2021

(54) SENSOR FOR ANALYZING GASES

(71) Applicant: Heraeus Nexensos GmbH, Hanau (DE)

(72) Inventors: Dieter Teusch, Bruchkoebel (DE);
Stefan Dietmann, Alzenau (DE);
Matthias Muziol, Mainhausen (DE)

(73) Assignee: Heraeus Nexensos GmbH, Hanau (DE)

( * ) Notice: Subject to any disclaimer, the term of this patent is extended or adjusted under 35 U.S.C. 154(b) by 60 days.

(21) Appl. No.: 16/484,562

(22) PCT Filed: Jan. 2, 2018

(86) PCT No.: PCT/EP2018/050062
§ 371 (c)(1),
(2) Date: Aug. 8, 2019

(87) PCT Pub. No.: WO2018/145822
PCT Pub. Date: Aug. 16, 2018

(65) Prior Publication Data
US 2020/0033282 A1 Jan. 30, 2020

(30) Foreign Application Priority Data

Feb. 13, 2017 (EP) ..................................... 17155772

(51) Int. Cl.
*G01N 27/12* (2006.01)
(52) U.S. Cl.
CPC ..................... *G01N 27/12* (2013.01)
(58) Field of Classification Search
CPC ........................... G01N 27/12; G01N 27/4078
USPC .................. 324/713, 691, 649, 600
See application file for complete search history.

(56) References Cited

U.S. PATENT DOCUMENTS

| | | | |
|---|---|---|---|
| 3,891,529 A | 6/1975 | Beesch | |
| 3,920,172 A | 11/1975 | Rhee | |
| 4,399,017 A | 8/1983 | Inoue et al. | |
| 6,223,583 B1 | 5/2001 | Friese et al. | |
| 6,418,777 B1 | 7/2002 | Noda et al. | |
| 2003/0146093 A1 | 8/2003 | Akiyama et al. | |
| 2007/0056353 A1 | 3/2007 | Weyl et al. | |

(Continued)

FOREIGN PATENT DOCUMENTS

| CN | 1453581 | 11/2003 |
|---|---|---|
| CN | 101726513 | 6/2010 |

(Continued)

*Primary Examiner* — Giovanni Astacio-Oquendo
(74) *Attorney, Agent, or Firm* — Dicke, Billig & Czaja, PLLC (57) ABSTRACT

A sensor for the analysis of gases, with at least one housing having an internal space of the housing having a first opening and a second opening situated opposite it. At least one sensor element arranged in the internal space of the housing. At least one glass element and at least one encapsulating element arranged in the internal space of the housing in an intervening space between a housing wall in the internal space of the housing and the sensor element and fully surround at least regions of the sensor element. The glass element is at the first opening of the internal space of the housing and is adapted to hermetically seal the intervening space. The encapsulating element is arranged on the glass melting element in the direction of the second opening and is adapted to affix the sensor element in the internal space of the housing in a form-fitting manner.

15 Claims, 4 Drawing Sheets

(56) References Cited

U.S. PATENT DOCUMENTS

| | | | | |
|---|---|---|---|---|
| 2016/0146779 A1* | 5/2016 | Gallagher | .......... | G01N 33/4972 73/23.3 |
| 2016/0206223 A1* | 7/2016 | Miethke | ................ | A61B 5/686 |
| 2018/0238797 A1* | 8/2018 | Sanroma | ................ | G01N 21/01 |
| 2020/0326298 A1* | 10/2020 | Chrzan | ................ | G01N 27/416 |
| 2020/0407004 A1* | 12/2020 | Krugman | ............. | B62K 25/286 |
| 2021/0022642 A1* | 1/2021 | Verhoeven | ............. | A61B 5/082 |

FOREIGN PATENT DOCUMENTS

| | | |
|---|---|---|
| DE | 10 2007 018 001 | 10/2008 |
| EP | 0932039 | 7/1999 |
| JP | S49107590 | 10/1974 |
| JP | S59104057 | 6/1984 |
| JP | 2000509823 | 8/2000 |
| JP | 2005108689 | 4/2005 |
| JP | 2009175135 | 8/2009 |
| WO | 2008125400 | 10/2008 |

\* cited by examiner

Fig. 6

SENSOR FOR ANALYZING GASES

CROSS REFERENCE TO RELATED APPLICATION

This Utility Patent Application claims priority under 35 U.S.C. § 371 to International Application Serial No. PCT/EP2018/050062, filed Jan. 2, 2018, which claims the benefit of European Patent Application No. EP 17155772.1, filed Feb. 13, 2017; which are both incorporated herein by reference.

The present invention relates to a sensor for the analysis of gases according to the generic part of patent claim 1. Moreover, the invention relates to a method for producing a sensor.

A wide range of sensors for the analysis of gases is known from the prior art. Said sensors are often used in an exhaust gas system of combustion engines, for example as soot sensors. Said sensors are exposed to high stress in terms of temperature, vibrations, and corrosion. Therefore, for the sensor to function, it is necessary that the sensor element used in the sensor, usually a sensor strip on a ceramic substrate, is held in mechanically stable and gas-tight manner in a housing of the sensor.

Therefore, sensor strips on a ceramic substrate are often affixed in a housing in soot sensors by means of "dry pressed powder packing". U.S. 2016/0273944 A1, for example, describes a sensor of this type that comprises a sensor element that is surrounded by a pressed mineral powder and is being held by the mineral powder. An alternative design including ceramic form parts instead of mineral powder is described in DE 197 07 456 A1. Here, the sensor element is mechanically held in a longitudinal bore hole of a housing of the sensor by means of two ceramic form parts and is closed off by means of a glass seal in gas-tight manner only with respect to the ceramic form part, but not moisture-tied with respect to the housing.

However, the solutions known from the prior art are disadvantageous in that the "dry pressed powder packing" construction allows moisture to accumulate in the rear region of the sensor. The loss of insulation caused by the moisture can lead to erroneous measurements. Likewise, the sensor elements may be damaged when the powder is being compacted. During the insertion of the sensor element into a ceramic form part using glass solder, the glass solder can damage part of the connecting means of the sensor element, for example the connecting wires. Moreover, this limits the insertion temperature of the sensor. As a result of the mechanically "rigid" clamping of the sensor element in the ceramic form part, the sensor element may be damaged. In the worst case, sensor breakage may occur.

It is therefore the object of the present invention to provide an improved sensor that overcomes the disadvantages of the prior art. In particular, to provide a high temperature-resistant sensor featuring:
  improved sealing of the connecting region;
  improved uncoupling of the sensor element from mechanical stresses;
  improved temperature cycling resistance;
  improved resistance to media; and
  improved mounting versatility.

Said object is met according to the invention by a sensor according to the subject matter of patent claim 1.

To this end, the sensor according to the invention for the analysis of gases comprises:

at least one housing with an internal space of the housing with a first opening and a second opening that is situated opposite from the first opening;

at least one sensor element that is arranged, at least in part, in the internal space of the housing; and at least one glass element and at least one encapsulating element, which are arranged in the internal space of the housing in an intervening space between a housing wall in the internal space of the housing and the sensor element and fully surround at least regions of the sensor element, whereby the glass element is arranged at the first opening of the internal space of the housing in the internal space of the housing and is adapted to hermetically seal the intervening space in the direction of the first opening, and whereby the encapsulating element is arranged on the glass melting element in the direction of the second opening and is adapted to affix the sensor element in the internal space of the housing in a form-fitting manner.

The term "analysis of gases" can be used, for example, to denote a determination and/or detection of soot particles in the exhaust gases of a motor vehicle. In addition, an "analysis of gases" can just as well comprise the detection of a temperature of a gas and/or of exhaust gases. Moreover, an "analysis of gases" can just as well comprise the detection of the chemical composition of a gas and/or of exhaust gases. The term "housing" can be understood to be a holder for the sensor element that is connected to the sensor element.

The terms "first opening" and "second opening" can be used to describe opposite openings and/or opposite regions with receding material on the housing or in the surface of the housing. For example, the sensor element can be arranged in the housing and can extend from the first and/or second opening and/or project from the openings. For this purpose, the openings can, for example, be larger than a diameter of the sensor element.

Moreover, for example the term "first opening" can be used in order to describe an opening near a connecting region or on the connecting region of the sensor and/or sensor element, and the term "second opening" can be used to describe an opening near a measuring region or on the measuring region of the sensor and/or sensor element.

The term "fully surround at least regions" can be used to describe that at least the outer surface of the sensor element is fully surrounded, for example by 360°, by the corresponding element in a longitudinal section of the sensor element. In addition, the term "affix in form-fitting manner" can be used to describe a non-detachable connection between the sensor element and the encapsulating element.

The encapsulating element can just as well be adapted, for example as a function of the composition of the encapsulating element that is used, to affix the sensor element in the internal space of the housing in a form-fitting and firmly-bonded manner.

Accordingly, the term "firmly-bonded" describes a connection, in which the connected partners are kept together through atomic or molecular forces. They concurrently are non-detachable connections that can be separated only by destroying the connecting means.

Accordingly, the invention is based on finding, surprisingly, that improved sealing of the connecting region of the sensor can be attained. At the same time, the mechanical stresses acting on the sensor element during the production and use of the sensor are reduced. Moreover, the forces acting on the sensor element can be kept away from the glass element by the encapsulating element. In addition, the sensor according to the invention permits the use of shorter sensor elements, for example shorter sensor strips, which is associated with savings in terms of materials and costs.

The invention is the first to create an improved encapsulation of the sensor. The glass element assumes the sealing function in the colder region and is supported by the encapsulating element. The ingress of moisture through the first opening of the housing is prevented by this means. The encapsulating element is high temperature-resistant and assumes the mechanical fastening of the sensor strip without mechanically damaging the sensor strip.

In an exemplary embodiment, the encapsulating element and the glass element are affixed to each other in form-fitting and/or firmly-bonded manner.

Said arrangement improves the stability and durability of the sensor. A form-fitting and/or firmly-bonded connection can just as well be implemented between all components of the sensor element, i.e. a form-fitting and/or firmly-bonded connection of the housing, encapsulating element, glass element, and sensor element.

In another exemplary embodiment, at least one end region/end regions of the sensor element project(s) at least in part from the first opening and/or the second opening.

In a further exemplary embodiment, the housing comprises at least one connecting flange.

The connecting flange can, for example, be a flat fin that is arranged about the housing and/or can be provided jointly with the housing in a one-part design.

In the preceding exemplary embodiment, the sensor can further comprise at least one first attachment part, whereby the first attachment part is adapted to surround the sensor element at the first opening, and/or the sensor comprises at least one second attachment part, whereby the second attachment part is adapted to surround the sensor element at the second opening, and whereby the first attachment part and/or the second attachment part are fastened to the connecting flange, in particular are welded to the connecting flange.

In this context, the term "surround" can be used synonymous to "cover" or "encapsulate". For example, the first and the second attachment part each can also be a component of an exhaust gas system.

The connecting flange can advantageously be used to arrange further attachment parts to the sensor housing. For example, the further attachment parts can be welded to the flange. It is also advantageous for the flange, as a "spring", to effect a mechanical uncoupling.

In a further exemplary embodiment, the housing comprises a metal sleeve, in particular a deep-drawing sleeve, preferably the metal sleeve comprises a tapering at the first opening. Said design permits the production to be simpler and less expensive and the dimensions of the resulting sensor to be smaller.

In an exemplary embodiment, the housing comprises a cobalt alloy, in particular a nickel-cobalt alloy comprising Alloy 605, and/or
the housing has a wall thickness ranging from 0.2 mm to 0.6 mm.

Said choice of materials provides for good processing features and for good heat resistance of the sensor housing.

Advantageously, the low thickness of the material effects a softer clamping in the full sensor.

In another exemplary embodiment, the glass element comprises a glass solder. The advantageous effect of the glass solder is that the sensor element can be sealed hermetically, i.e. air-tight, in the direction of and/or at the first opening and that there is no ingress of moisture. Advantageously, the glass solder is expansion-matched, tight-fusing, media-resistant, and comprises PbO, Al2O3, SiO2, B2O3, and further components.

In an exemplary embodiment, the encapsulating element comprises a ceramic encapsulation, in particular an aluminium oxide-based expansion-matched encapsulation. Advantageously, the ceramic encapsulation can assume the mechanical fastening of the sensor element without straining the sensor element.

In yet another exemplary embodiment, the sensor element comprises:
at least one sensor strip comprising at least one substrate, in particular a ceramic substrate;
at least one measuring means, in particular a measuring resistor that is arranged on the substrate; and
at least one connecting means, preferably the measuring means and/or the connecting means are arranged, at least in part, outside the internal space of the housing.

For example, the sensor element can be a sensor element of a soot sensor. In this context, the base can be a substrate made of a ceramic material, e.g. Al2O3. A meander serving as heating element can be applied to one side of the substrate. At least two electrodes can be applied as measuring means on the opposite side of the substrate. The two electrodes can be provided, for example, as tortuous meander or as interdigitated comb structure. Specifically, platinum can be used as electrode material, since it is electrically conductive and can withstand the high temperature peaks in the exhaust gas. The connecting means can be, for example, connecting wires made of nickel wire with a platinum jacket.

In a further exemplary embodiment, the glass element and the encapsulating element can be arranged in the internal space of the housing in the intervening space between the housing wall of the internal space of the housing and the substrate of the sensor element and can fully surround at least regions of only the substrate of the sensor element.

Advantageously, the connecting means is not being surrounded by the glass element, but only the substrate of the sensor element. As a result, the glass element, for example the glass solder, cannot attack the connecting means, for example the connecting wire.

In yet another exemplary embodiment, the sensor element is adapted to be operated as a gas sensor, soot sensor, lambda sensor, temperature sensor, chemo-sensor or flow sensor or any combination of said sensors and/or as heating element.

Advantageously, the sensor according to the invention can be used universally for a wide range of applications.

The invention also proposes a method for producing a sensor according to the invention. The method comprises the following steps:
Providing at least one housing having an internal space of the housing having a first opening and a second opening that is situated opposite from the first opening, at least one sensor element, at least one glass element, and at least one encapsulating element;
arranging the sensor element, at least over regions thereof, in the internal space of the housing, and arranging the glass element and the encapsulating element in the internal space of the housing in an intervening space between a housing wall of the internal space of the housing and the sensor element such that these fully surround at least regions of the sensor element; and
heating the sensor until the glass element at the first opening of the internal space of the housing hermetically seals the intervening space in the direction of the first opening and the encapsulating element, which is arranged on the glass melting element in the direction of the second opening, affixes the sensor element in the internal space of the housing in a form-fitting manner.

In an exemplary embodiment, the method is characterised in that the heating comprises at least one sensor burning process, preferably in a kiln.

In this context, the encapsulating element and the glass element can be sintered to the housing and to the sensor element and/or can be melted by means of the burning process in another exemplary embodiment.

Further features and advantages of the invention are evident from the following description, in which preferred embodiments of the invention are illustrated by means of schematic drawings.

Figure 1A:
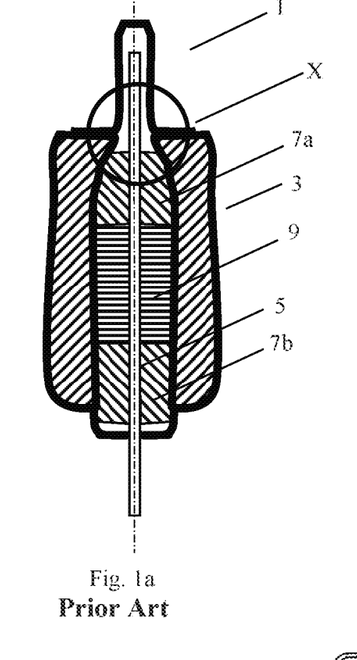
FIG. 1a, 1b, 1c shows schematic sectional views of sensors known from the prior art.

FIG. 1a shows a schematic sectional view of a sensor 1 as known from the prior art. Shown for exemplary purposes, sensor 1 comprises a sensor element 5, for example a sensor strip that is assembled in a housing 3 by means of "dry pressed powder packing". FIG. 1a shows that the sensor element 5 is held by a pressed powder 9 that is arranged between two ceramic discs 7a, 7b. The rear connecting region of the sensor 1 is marked by a circle "X". As mentioned above, moisture can push through the pressed powder 9 in the sensor 1a shown here and can get into the connecting region of the sensor 1.

Figure 1B:
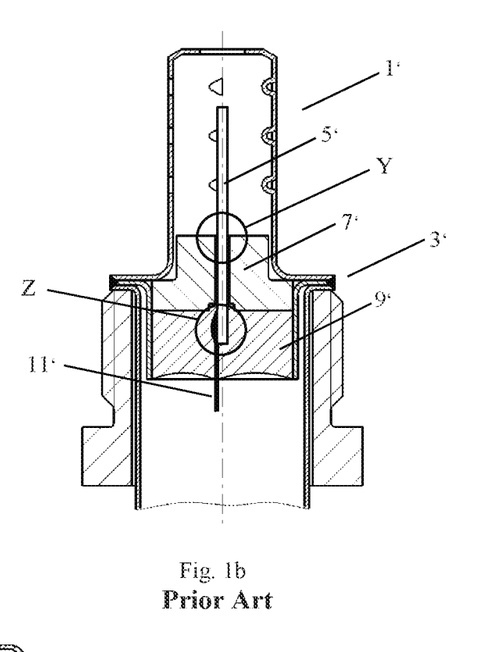

FIG. 1b shows an alternative embodiment of a sensor 1' that is known from the prior art that is described in the earlier-mentioned prior art document U.S. 2016/0273944 A1. In the embodiment shown in FIG. 1b, the sensor element 5' is held by a ceramic form part 7'. An end region of the sensor element 5' with the connecting means 11', for example a connecting wire, is encapsulated, for example in glass solder, in a glass element 9'. The feedthrough of the sensor element 5' leading through the ceramic form part 7' is marked by a circle "Y". As is evident from FIG. 1b, the sensor element 5' can hit against the ceramic edge of the ceramic form part 7' and fracture. The encapsulated connecting means 11' in the glass element 9' is marked by a circle "Z". In the sensor 1' shown in FIG. 1b, the glass element 9' and/or the glass solder can corrosively attack the connecting means 11'.

Figure 1C:
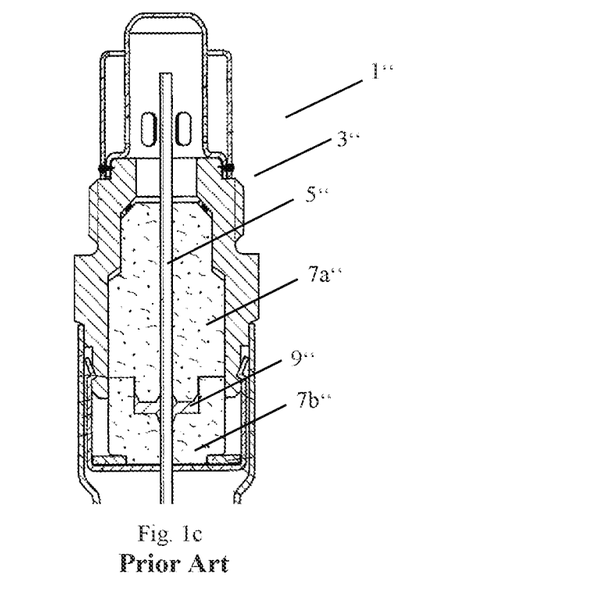

FIG. 1c shows another embodiment of a sensor 1' that is known from the prior art that is described in the earlier-mentioned prior art document DE 197 07 456 A1. In the embodiment shown in FIG. 1c, the sensor element 5" is held by two ceramic form parts 7a", 7b". A glass element 9", which closes off in gas-tight manner against the ceramic form parts 7a", 7b", is arranged between the two ceramic form parts 7a", 7b". However, the sensor element 5" can also hit against the outward-pointing edges of the ceramic form parts 7a", 7b" and fracture in the embodiment shown in FIG. 1c. Moreover, the embodiment shown in FIG. 1c does not provide a firmly-bonded seal between the end section of the sensor 1" on the connector side and the housing 3".

Figures 2A, 2B:
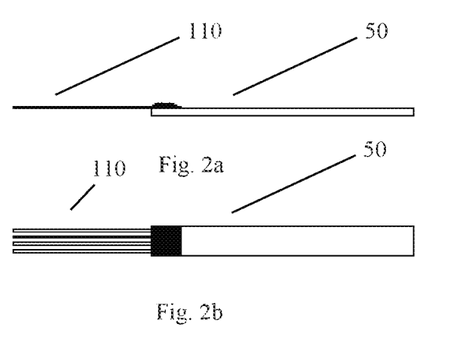
FIG. 2a, 2b shows a schematic side view and a schematic top view of a sensor element according to an embodiment of the invention.

FIGS. 2a, 2b show a schematic side view and a schematic top view of a sensor element 50 according to an embodiment of the invention. The sensor element 50, shown schematically in FIGS. 2a and 2b, can comprise a base that is formed from a substrate made from a ceramic material. For example, the substrate can comprise Al2O3, have a length of 32 mm, a width of 3.6 mm, and a thickness of 1 mm. A meander can be applied on the right side of the substrate (not shown) and at least two electrodes can be applied as measuring means on the other side (not shown). However, a person skilled in the art is aware that measuring means based on a different working principle can be used just as well.

The sensor element 50 shown in FIGS. 2a, 2b also comprises connecting means 110 in the form of connecting wires. For example, said connecting wires can be manufactured from nickel wire with a platinum jacket and have a diameter of 0.2 mm However, a person skilled in the art is aware that the connecting wires can just as well comprise different materials and/or different cross-sections.

For example, the sensor element can be a sensor element of a soot sensor. In this context, the base can be a substrate made of a ceramic material, e.g. Al2O3. A meander serving as heating element can be applied to one side of the substrate. At least two electrodes can be applied as measuring means on the opposite side of the substrate. The two electrodes can be provided, for example, as tortuous meander or as interdigitated comb structure. Platinum can be used as electrode material, since it is electrically conductive and can withstand the high temperature peaks in the exhaust gas.

Figure 3:
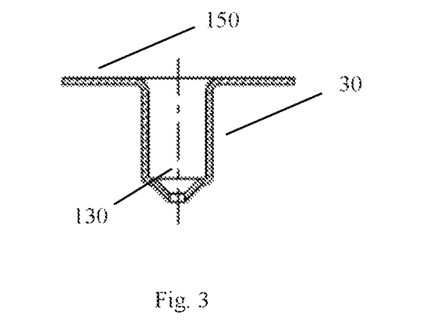
FIG. 3 shows a schematic sectional view of a housing according to an embodiment of the invention.

FIG. 3 shows a schematic sectional view of a housing 30 according to embodiments of the invention. The housing 30 shown in FIG. 3 comprises an internal space of the housing 130 and comprises a metal sleeve that can be formed by a deep-drawing sleeve. Moreover, the housing 30 can comprise a cobalt alloy, in particular a nickel-cobalt alloy comprising Alloy 605. As is evident from FIG. 3, the housing 30 can have a low wall thickness, for example a wall thickness in the range of 0.2 mm to 0.6 mm, to be more easily deformable and to attain a softer clamping in the full sensor.

The housing 30 shown in FIG. 3 also comprises a connecting flange 150 that extends, in horizontal direction, annually about the external wall of the housing 30.

Figure 4A:
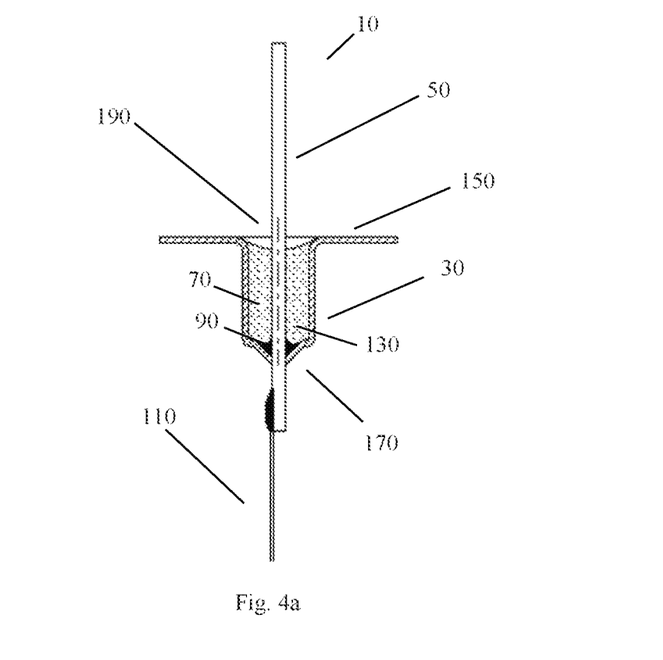
FIG. 4a, 4b shows a schematic sectional view and a perspective view of a sensor according to an embodiment of the invention.
Figure 4B:
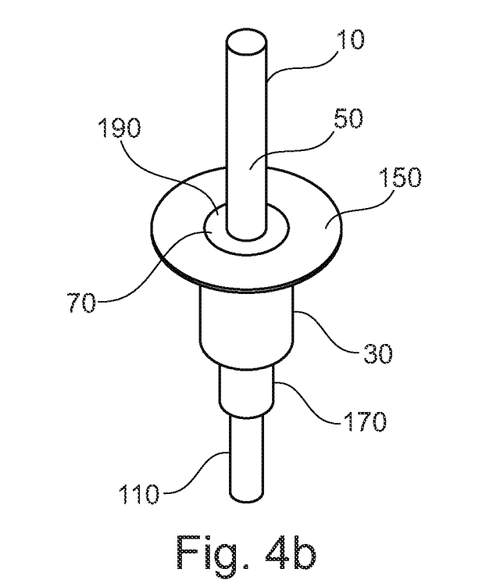

FIGS. 4a, 4b show a schematic sectional view and a perspective view of a sensor 10 according to an embodiment of the invention. In the embodiment shown, the sensor 10 comprises a housing 30 that can be a housing of the type shown in FIG. 3. The housing 30 has an internal space of the housing 130 with a first opening 170 and a second opening 190 that is situated opposite from the first opening 170. In the embodiment shown, the connecting region of the sensor 10 with the connecting means 110 is situated at the first opening 170 and allows the sensor element 50 to be connected to an analytical unit (not shown). The measuring region of the sensor element 50 is situated at the second opening 190. The sensor element 50 is arranged in the internal space 130 of the housing 30, at least in part.

As shown in FIG. 4a, a glass element 90 is arranged at and/or in the first opening 170 of the internal space of the housing 130 in the internal space 130 of the housing 30 and hermetically seals the intervening space in the direction of the first opening 170. The glass element 90 can therefore comprise a glass solder that seals the intervening space and/or gap between the housing 30 and the sensor element 50 in firmly-bonded manner by means of a burning process.

An encapsulation element 70 that fully surrounds the glass element 90 from the sides facing away from the housing 30 is arranged on the glass element 90. In the embodiment shown, the sensor element 50 is affixed in form-fitting manner in the internal space 130 of the housing 30 by the encapsulation element 70.

Figure 5:
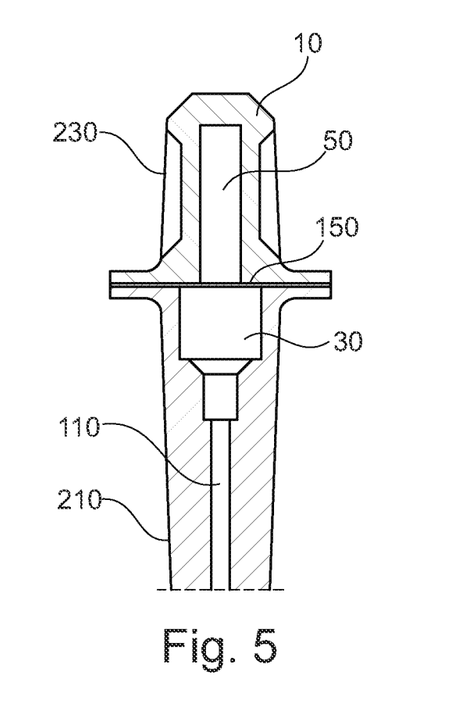
FIG. 5 shows a schematic side view of a sensor with a first and second attachment part arranged on it according to an embodiment of the invention.

FIG. 5 shows a schematic side view of a sensor 10 with a first and second attachment part 210, 230 arranged on it. As shown in FIG. 5, the first attachment part 210 is arranged at the first opening 170 of the sensor 10 and surrounds the part of the sensor element 50 that is arranged on the first opening 170. The second attachment part 230 is arranged at the second opening 190 of the sensor 10 and surrounds the part of the sensor element 50 that is arranged at the second opening 190. In the embodiment shown, the first attachment part 210 and the second attachment part 230 can be welded to the connecting flange 150. However, a person skilled in the art is aware that alternative connecting techniques, such as pressing or gluing of the two attachment parts 210, 230 to the connecting flange 150 can be applied just as well.

Figure 6:
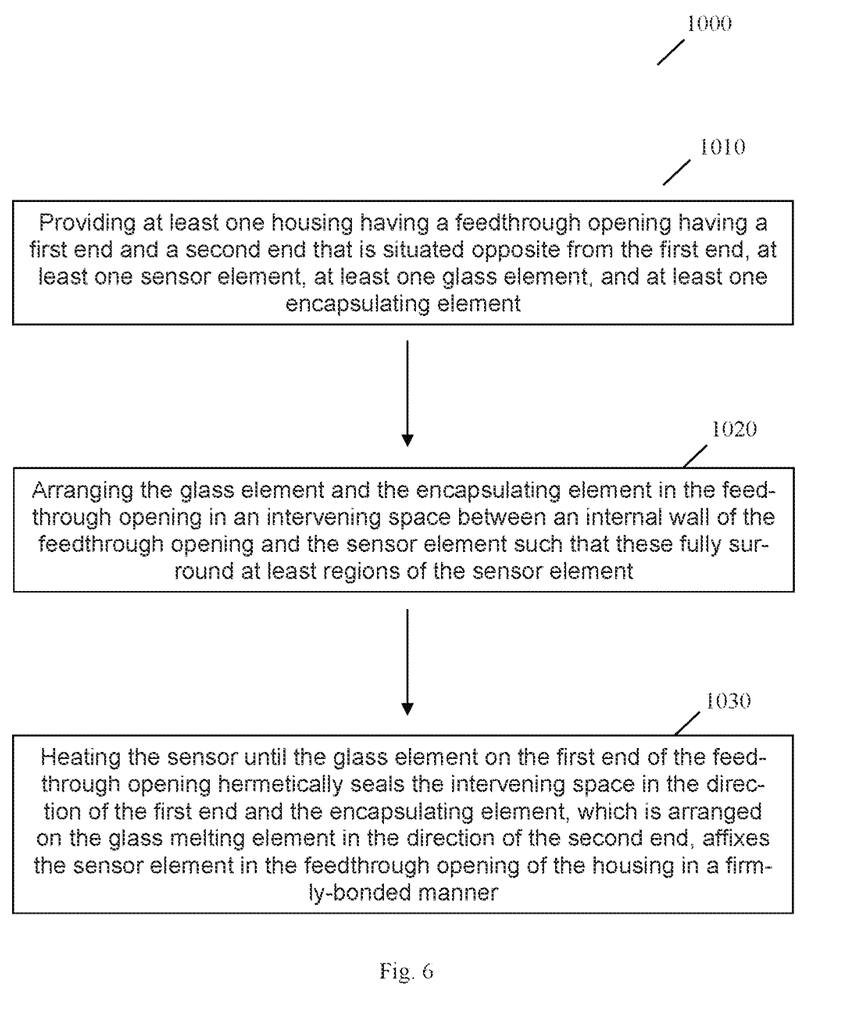
FIG. 6 shows a method for the production of a sensor according to an embodiment of the invention.

FIG. 6 shows a method 1000 for the production of a sensor 10 according to an embodiment of the invention. The method 1000 comprises the following steps:

Providing 1010 at least one housing 30 having an internal space of the housing 130 having a first opening 170 and a second opening 190 that is situated opposite from the first opening 170, at least one sensor element 50, at least one glass element 90, and at least one encapsulating element 70;

arranging 1020 the sensor element 50, at least over regions thereof, in the internal space of the housing 130, and arranging the glass element 90 and the encapsulating element 70 in the internal space of the housing 130 in an intervening space between a housing wall of the internal space of the housing 130 and the sensor element 50 such that these fully surround at least regions of the sensor element 50; and heating 1030 the sensor 10 until the glass element 90 at the first opening 170 of the internal space of the housing 130 hermetically seals the intervening space in the direction of the first opening 150 and the encapsulating element 70, which is arranged on the glass melting element in the direction of the second opening 190, affixes the sensor element 50 in the internal space 130 of the housing 30 in a firmly-bonded manner.

The features presented in the preceding description, the claims, and the figures can be essential to the various embodiments of the invention either alone or in any combination thereof.

LIST OF REFERENCE NUMBERS

1, 1', 1" Sensor
3, 3', 3" Housing
5, 5', 5" Sensor element
7a, 7b Ceramic disk
7', 7a", 7b" Ceramic form part
9 Pressed powder
9', 9" Glass element
11' Connecting means
X Rear connecting region
Y Feedthrough for sensor element
Z Connecting means embedded in glass element
10 Sensor
30 Housing
50 Sensor element
70 Encapsulating element
90 Glass element
110 Connecting means
130 Internal space of the housing
150 Connecting flange
170 First opening
190 Second opening
210 First attachment part
230 Second attachment part
1000 Method for production of a sensor
1010 Providing
1020 Arranging
1030 Heating

The invention claimed is:

1. A sensor for the analysis of gases, comprising:
at least one housing having an internal space of the at least one housing having a first opening and a second opening that is situated opposite from the first opening;
at least one sensor element arranged, at least in part, in the internal space of the at least one housing; and
at least one glass element and at least one encapsulating element arranged in the internal space of the at least one housing in an intervening space between a housing wall in the internal space of the at least one housing and the at least one sensor element and fully surround at least regions of the at least one sensor element;
wherein the at least one glass element is arranged at the first opening of the internal space of the at least one housing in the internal space of the at least one housing and is adapted to hermetically seal the intervening space in the direction of the first opening, and whereby the at least one encapsulating element is arranged on the at least one glass element in the direction of the second opening and is adapted to affix the at least one sensor element in the internal space of the at least one housing in a form-fitting manner.

2. The sensor of claim 1, wherein the at least one encapsulating element and the at least one glass element are affixed to each other in a form-fitting and/or firmly-bonded manner.

3. The sensor of claim 1, wherein at least one end region/end regions of the at least one sensor element project(s) at least in part from the first opening and/or the second opening.

4. The sensor of claim 1, wherein the at least one housing comprises at least one connecting flange.

5. The sensor of claim 1, wherein the sensor comprises at least one first attachment part, whereby the first attachment part is adapted to surround the at least one sensor element at the first opening, and/or the sensor comprises at least one second attachment part, whereby the second attachment part is adapted to surround the at least one sensor element at the second opening, and whereby the first attachment part and/or the second attachment part are welded to the connecting flange.

6. The sensor of claim 1, wherein the at least one housing comprises a deep-drawing metal sleeve, and wherein the metal sleeve comprises a tapering at the first opening.

7. The sensor of claim 1, wherein the at least one housing comprises one of a cobalt alloy, a nickel-cobalt alloy comprising Alloy 605, and the at least one housing has a wall thickness ranging from 0.2 mm to 0.6 mm.

8. The sensor of claim 1, wherein the at least one glass element comprises a glass solder.

9. The sensor of claim 1, wherein the at least one encapsulating element comprises an aluminum oxide-based expansion-matched encapsulation.

10. The sensor of claim 1, wherein the at least one sensor element comprises:
- at least one sensor strip comprising at least one ceramic substrate;
- at least one measuring resistor arranged on the substrate; and
- at least one connecting means, wherein the measuring resistor or the connecting means are arranged, at least in part, outside the internal space of the at least one housing.

11. The sensor of claim 10, wherein the at least one glass element and the at least one encapsulating element are arranged in the internal space of the at least one housing in the intervening space between the housing wall of the internal space of the at least one housing and the substrate of the at least one sensor element and fully surround at least regions of only the substrate of the at least one sensor element.

12. The sensor of claim 1, wherein the at least one sensor element is adapted to be operated as at least one of a gas sensor, a soot sensor, a lambda sensor, a temperature sensor, a chemo-sensor and a flow sensor.

13. A method for the production of a sensor comprising:
- providing at least one housing having an internal space of the at least one housing having a first opening and a second opening situated opposite from the first opening, at least one sensor element, at least one glass element, and at least one encapsulating element;
- arranging the at least one sensor element, at least over regions thereof, in the internal space of the at least one housing, and arranging the at least one glass element and the at least one encapsulating element in the internal space of the at least one housing in an intervening space between a housing wall of the internal space of the at least one housing and the at least one sensor element such that these fully surround at least regions of the at least one sensor element; and
- heating the sensor until the at least one glass element at the first opening of the internal space of the at least one housing hermetically seals the intervening space in the direction of the first opening and the at least one encapsulating element, which is arranged on the at least one glass melting element in the direction of the second opening, affixes the at least one sensor element in the internal space of the at least one housing in a form-fitting manner;
- wherein the at least one glass element is arranged at the first opening of the internal space of the at least one housing in the internal space of the at least one housing and is adapted to hermetically seal the intervening space in the direction of the first opening, and whereby the at least one encapsulating element is arranged on the at least one glass element in the direction of the second opening and is adapted to affix the at least one sensor element in the internal space of the at least one housing in a form-fitting manner.

14. The method of claim 13, wherein the heating comprises at least one sensor burning process in a kiln.

15. The method of claim 14, wherein the at least one encapsulating element and the at least one glass element are sintered to the at least one housing and to the at least one sensor element or are melted by means of the burning process.

* * * * *